United States Patent [19]

Sobolewski

[11] 4,440,092

[45] Apr. 3, 1984

[54] RAILWAY STEERING TRUCK LINEAR INDUCTION MOTOR ASSEMBLY

[75] Inventor: George Sobolewski, Laval West, Canada

[73] Assignee: Urban Transportation Development Corporation Ltd., Toronto, Canada

[21] Appl. No.: 229,718

[22] Filed: Jan. 28, 1981

Related U.S. Application Data

[63] Continuation of Ser. No. 890,319, Mar. 27, 1978, abandoned.

[30] Foreign Application Priority Data

Nov. 30, 1977 [CA] Canada ................................. 292092

[51] Int. Cl.³ ........................ B61B 13/12; B61C 5/00; H02K 41/02
[52] U.S. Cl. .................................. 104/291; 104/304; 105/49; 105/133; 105/168; 310/12
[58] Field of Search ............. 104/288, 289, 290, 291, 104/292, 293, 294, 304; 105/49, 77, 133, 136, 157 R, 165, 166, 167, 168, 171, 177, 182 R, 182 E, 199 R, 200, 201, 202, 224.1; 188/41; 310/12

[56] References Cited

U.S. PATENT DOCUMENTS

| | | | |
|---|---|---|---|
| 444,181 | 1/1891 | Robinson | 105/16 B |
| 450,813 | 4/1891 | Lamb et al. | 105/201 X |
| 555,857 | 3/1896 | Graham | 105/165 |
| 557,960 | 4/1896 | Brintnell | 104/288 |
| 573,823 | 12/1896 | Leffler | 104/291 |
| 727,918 | 5/1903 | Ellery | 105/168 |
| 3,516,364 | 6/1970 | Machefert-Tassin | 105/77 X |
| 3,516,365 | 6/1970 | Lich | 105/133 |
| 3,589,302 | 6/1971 | Usami | 105/168 X |
| 3,602,149 | 8/1971 | Lich | 104/291 |
| 3,789,770 | 2/1974 | List | 105/202 X |
| 3,799,066 | 3/1974 | Jackson | 105/136 X |
| 3,855,940 | 12/1974 | Pinto | 105/77 |
| 3,877,387 | 4/1975 | Kasai et al. | 105/157 R X |
| 4,046,080 | 9/1977 | Dieling et al. | 105/177 X |
| 4,131,069 | 12/1978 | List | 105/224.1 X |

FOREIGN PATENT DOCUMENTS

| | | | |
|---|---|---|---|
| 1053976 | 11/1977 | Canada | 105/168 |
| 1275187 | 7/1969 | United Kingdom | 105/77 |
| 1200201 | 7/1970 | United Kingdom | 105/77 |
| 1242682 | 8/1971 | United Kingdom | 105/77 |

*Primary Examiner*—Robert B. Reeves
*Assistant Examiner*—Howard Beltran
*Attorney, Agent, or Firm*—Charles A. Blank

[57] ABSTRACT

A steerable truck comprises a pair of wheelsets spaced apart along the longitudinal axis of the truck, each supporting a respective steering yoke. A main frame is supported by the yokes which are connected to the main frame to permit rotation of each yoke relative to the main frame about a respective vertical steering axis. A linear induction motor is located beneath the yokes for cooperation with a reaction rail to propel the truck. A suspension device suspends the motor from the yokes to maintain the motor a fixed height from the reaction rail. The thrust of the motor is transmitted to one of the yokes and a centering device is provided to inhibit lateral displacement of the motor relative to the yokes. The suspension device comprises three links each having universal connections at each end for connection to the motor and a respective one of the yokes. Two of the links are connected at spaced locations between one of the yokes and the motor and other of the links is connected between the other of the axle assemblies and the motor. The three point suspension so provided permits steering and torsional deflection between the yokes while vertically supporting the motor.

21 Claims, 6 Drawing Figures

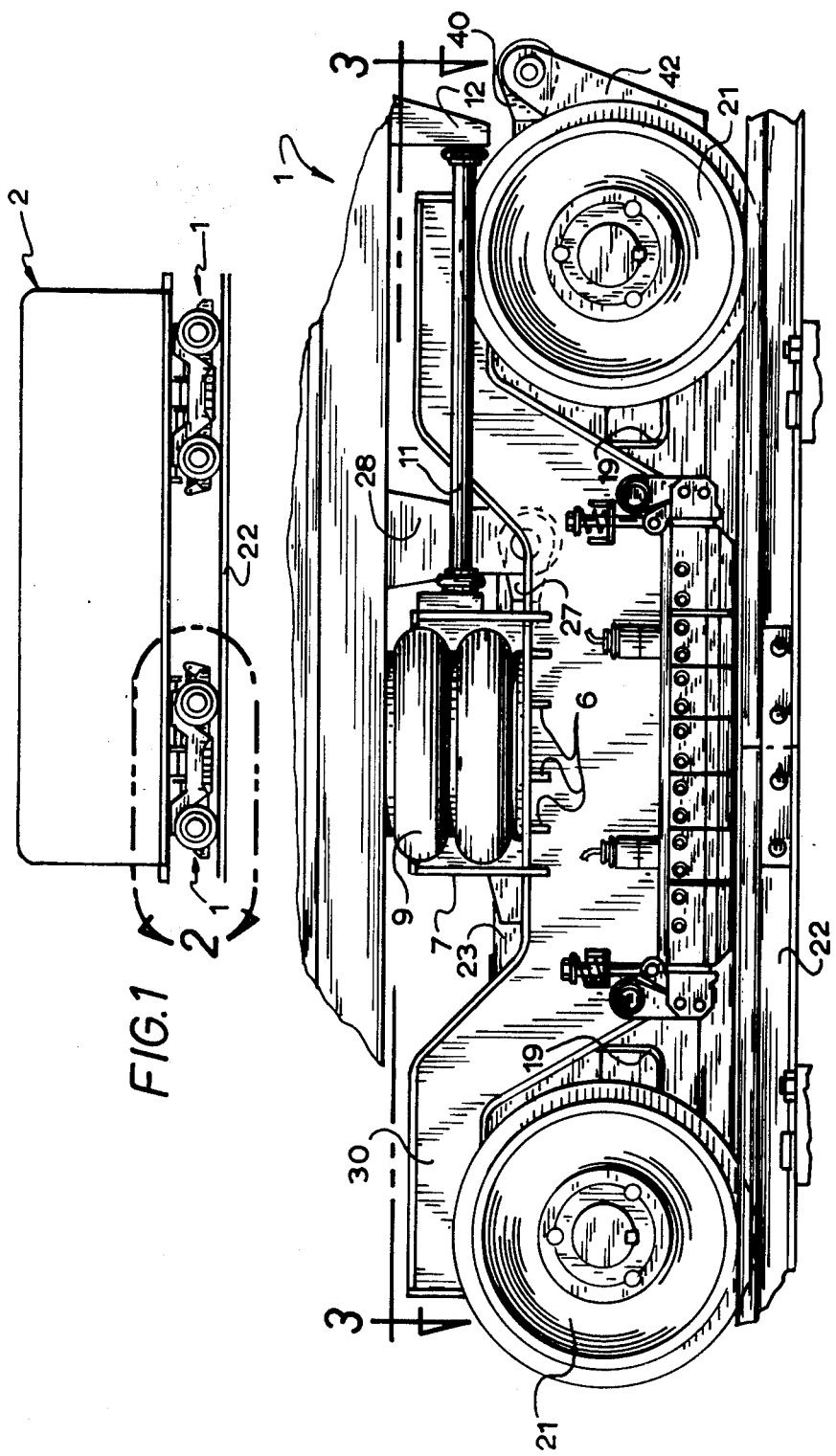

RAILWAY STEERING TRUCK LINEAR INDUCTION MOTOR ASSEMBLY

This is a continuation of application Ser. No. 890,319 filed Mar. 27, 1978, now abandoned.

This invention relates to a railway truck, and more particularly, to a railway truck of the steerable type designed for propulsion by a linear induction motor or LIM.

It is known that a linear induction motor or LIM requires to be maintained with a precise and constant gap above a reaction rail to assure efficient operation and propulsion by the LIM. For a conventional railway truck even without steering of the wheel axles, there is resilient suspension of the truck frame elements relative to the wheel axles and this results in undesirable up and down motion of the truck frame elements relative to the rails; thus the truck frame elements cannot provide suitable support for the LIM. In such a case, the LIM would undergo unacceptable up and down movement relative to the raction rail causing the air gap to vary beyond acceptable limits.

Further, in a railway truck wherein the wheel axles are steered radially to a curve, the mobility of the frame elements or yokes to achieve such steering increases the difficulty to achieve the aforementioned precisely controlled gap.

It is a general object of the present invention to provide a railway truck of the steering type with a linear induction motor or LIM unit which is maintained with a precise gap above a reaction rail.

It is another object of the present invention to provide a railway truck and LIM propulsion assembly which is of relatively simple construction and of reliable operation.

It is another object of the present invention to provide a railway truck and LIM propulsion assembly which link connections, and with universal connection ends to allow the necessary freedom of pivoting and twisting motions between the LIM and the supporting truck frame elements.

The above and other objects and advantages of the present invention will be better understood with reference to the following detailed description of a preferred embodiment thereof which is illustrated, by way of example, in the accompanying drawings; in which:

FIG. 1 is a side elevation view of a railway car embodying a pair of railway truck and LIM propulsion assemblies according to the present invention;

FIG. 2 is a side elevation view of a railway truck and LIM propulsion assembly as encircled by the arrow 2 in FIG. 1;

Figure 3:
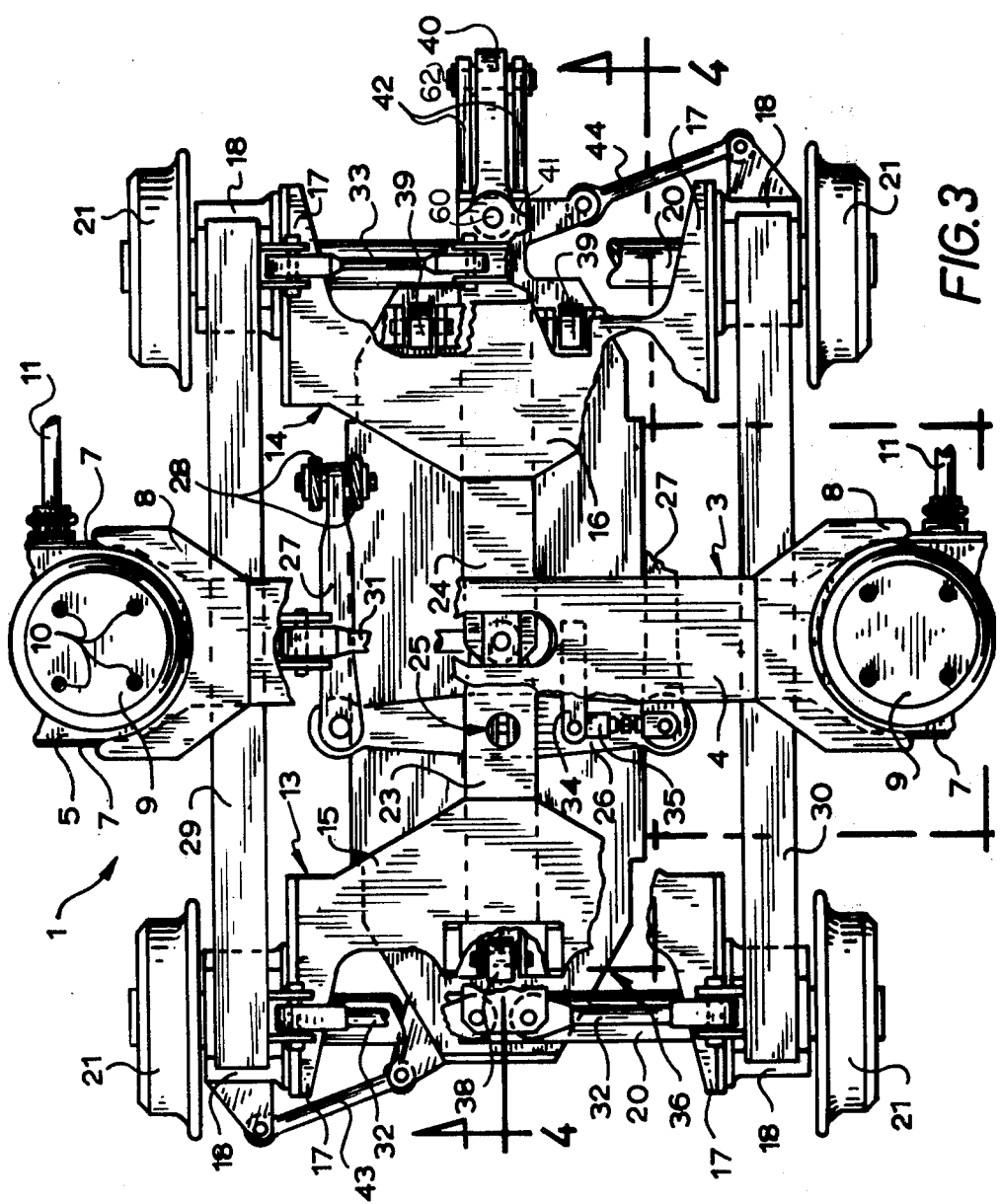
FIG. 3 is a plan view as seen along line 3—3 in FIG. 2 and with parts broken away to better show the LIM unit.
Figure 4:
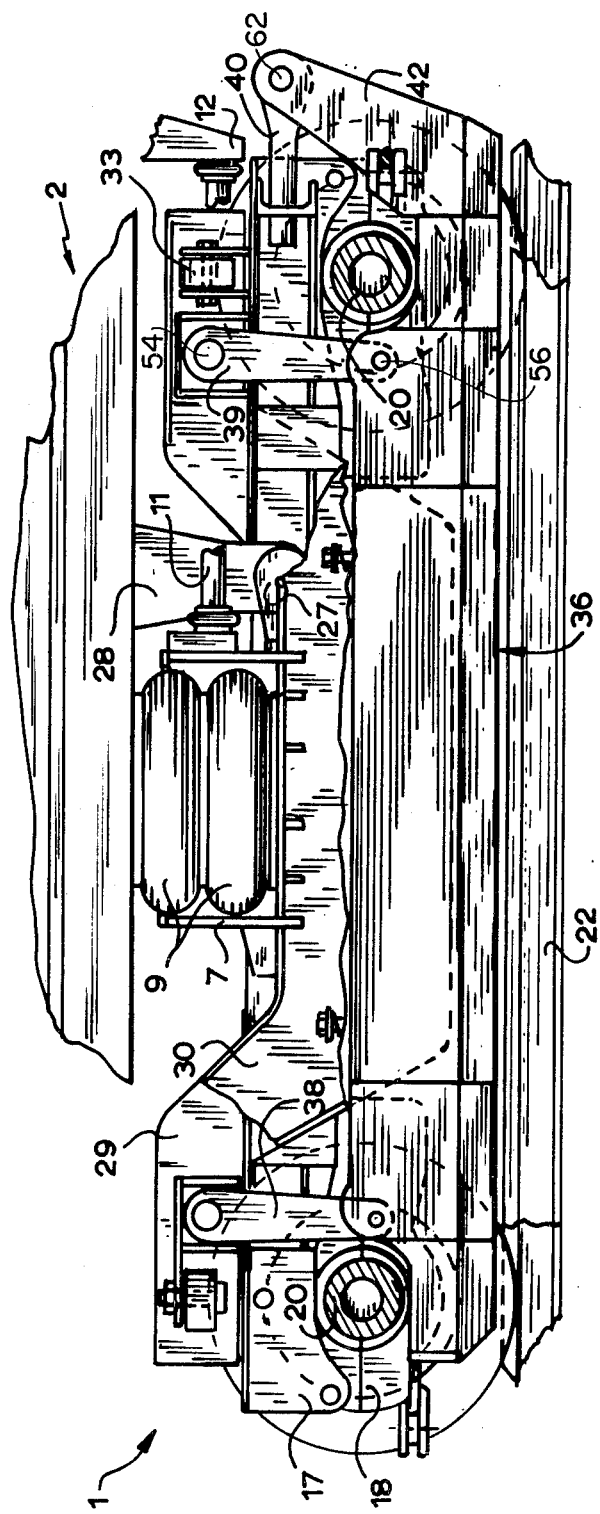
FIG. 4 is a cross-sectional view as seen along line 4—4 in FIG. 3.

The railway truck 1 according to the present invention, as shown in FIG. 1, is used in a pair to carry a car body 2 of any desired construction. This railway truck 1 is connected to the car body 2 by means of a bolster 3 and associated elements to support the car body.

The bolster 3 includes an intermediate portion 4 of tubular construction having a uniform rectangular cross section. Each end of the bolster 3 includes a baseplate portion 5 which is positioned lower than the intermediate bolster portion 4. Stiffening ribs 6 are secured against the bottom of each baseplate portion 5 and extend longitudinally of the bolster. Each baseplate portion 5 is provided with a pair of side plates 7 upwardly extending edgewise along the opposite sides thereof. A generally C shape top plate 8 is fixed on the upper edge of each pair of adjacent side plates 7 to cooperatively form with the latter and with the corresponding baseplate portion 5 a protected recess for an air spring unit 9. The latter may be of any appropriate and known construction currently used in the art. The two air springs 9 of each bolster 3 are fixed to the railway car body 2, such as by bolts 10 and carry the load of the corresponding end of the car body. The two side plates 7 on the inboard side of the bolster 3 are connected to the car body 2 by means of a pair of bolster drag links or rods 11. More specifically, each bolster drag link or rod 11 has one end pivoted to the corresponding side plate 7 of the bolster and the other end pivotally connected to a bracket 12 fixedly secured to and downwardly projecting from the bottom of the railway car body. The opposite ends of each bolster drag link 11 are vertically pivoted to accommodate the springing movement between the car body and the bolster and they are also provided with resilient bushings providing limited universal movement to accommodate the very small transverse displacement of the car body relative to the bolster.

The railway truck includes an outboard and an inboard yokes 13 and 14 respectively. The outboard yoke 13 includes a main frame 15 while the inboard yoke 14 includes a main frame 16. Each main frame 15 and 16 includes a pair of laterally spaced apart projections 17 to each of which is secured a journal housing 18. Each main frame 15 and 16 is formed with an underlying transverse beam portion 19. The journal housings 18 of each yoke 13 and 14 rotatably retains a wheel axle 20 having a flanged wheel 21 on each of the two opposite outer ends thereof. Thus, the flanged wheels 21 are adapted to carry the yokes and the remainder of the railway truck assembly on rails 22.

The outboard yoke 13 is provided with a longitudinal bar 23 rigidly secured centrally to the main frame 15 and projecting inboard therefrom. Similarly, the main frame 16 is provided with a longitudinal bar 24 which is rigidly secured centrally thereto and projects outboard therefrom the two bars 23 and 24 have their free end pivoted one to the other at equal distances from the wheel axles 20 and thus, centrally under the bolster 3.

The bars 23 and 24 are pivotally suspended to the bolster at 25 by a pivot connection which also pivotally supports a steering crossbar 26 which pivots at 25 about a vertical axis. A pair of yoke drag links or rods 27 are pivotally connected at one end to a corresponding end of the steering crossbar 26 and at the other end to a bracket 28 rigidly depending from the car body 2.

A pair of side frames 29 and 30 are positioned on the opposite sides respectively of the railway truck and longitudinally extend parallel one to the other. Each side frame has its inboard end pivoted on the corresponding journal housing 18 by means of resilient pad. Each side frame has its outboard end resting on a sliding pad over the corresponding journal housing 18. Each end of the bolster 3 rests on a sliding pad at the center of the corresponding side frame. Thus, the load of the railway car 2 is transmitted directly through the air springs 9, and the opposite ends of the bolster 3 onto the sliding pads at the center of the side frames 29 and 30. Thus, the sliding pads allow relative longitudinal displacement between the journal bearings 18 or yokes 13,14, the bolster 3 and the side frame. Such displacement occurs in a curve upon angular displacement of the car body 2 and bolster 3 therewith relative to the side frames and the railway truck as a whole. As will be explained later, this angular displacement of the car body steers the yokes 13, 14 to align the wheel axles 20 radially to the curve. Such steering displacement of the yokes results in relative sliding between the yokes and the side frames 29,30 on the corresponding sliding pads.

A lateral stabilizing link or rod 31 extends laterally of the truck and is pivotally connected to the central portion of the bolster 3 and to the side frame 29. This link 31 accurately restrains the lateral position of the side frame 29 relative to the bolster 3. A set of three yoke centering links 32,32,33 extend laterally and are pivotally connected at one end to one end of a side frame and at the other end, near the center line of the corresponding yoke. These links 32, 32, and 33 are provided to laterally restrain the lateral position of the side frames 29,30 relative to the yokes 13 and 14 and provide an axis of rotation for steering movement of the yokes 13, 14 relative to the side frames 29, 20.

The steering crossbar 26 is connected to an arm 34 which is fixedly secured to the central portion 4 of the bolster and extends longitudinally of the railway car body by an adjustable link 35 which is pivotally connected to the arm 34 and the adjacent drag link 27 which extends generally parallel to the steering crossbar 26.

When the railway car traverses a curve, the car body 2 and the bolster 3 slightly pivot relative to the yokes and to the longitudinal axis of the railway truck. As a result, the arm 34 and adjustable link 35 act on the yoke drag links 27 and the crossbar 26 to keep it relatively fixed with respect to the car body centerline. The latter acts at 25 on the yoke 13 to steer the corresponding wheel axle 20 to a position which is essentially radial to the curve in the rails 22. The aforementioned pivot connection between the two yokes 13 and 14 causes the yoke 14 to be also steered to a radial position relative to the track curve.

To allow for such steering action and to provide for vertical irregularities in the rails 22, the yokes 13 and 14 and the side frames 29 and 30 are connected by links 32, 33 through universal joints to allow limited movement relative to each other. The yokes 13 and 14 are stiffly sprung relative to the wheel axles 20 by a resilient bushing, not shown, around the bearing in each journal housing 18. Consequently, the yokes 13 and 14 at the wheel axles 20 remain at practically the same constant height relative to the rails 22.

The railway truck and LIM propulsion assembly, according to the present invention, includes the aforedescribed railway truck 1 and bolster 2 in combination with the hereinafter described linear induction motor or LIM unit 36 and associated connecting links. The railway truck 1 and bolster 2 are defined and shown in more details in the Applicant's copending patent application Ser. No. 890318 now U.S. Pat. No. 4,221,172.

Figure 5:
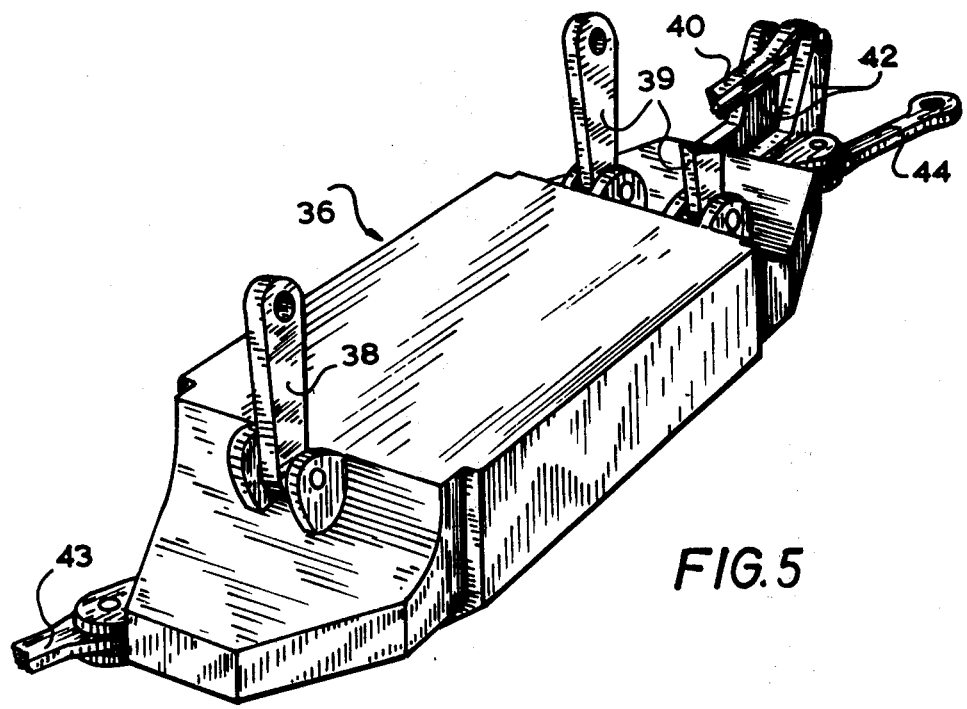
FIG. 5 is a perspective view of the linear induction motor or LIM unit with the associated restraining links connected thereto some of which are shown only in part.
Figure 6:
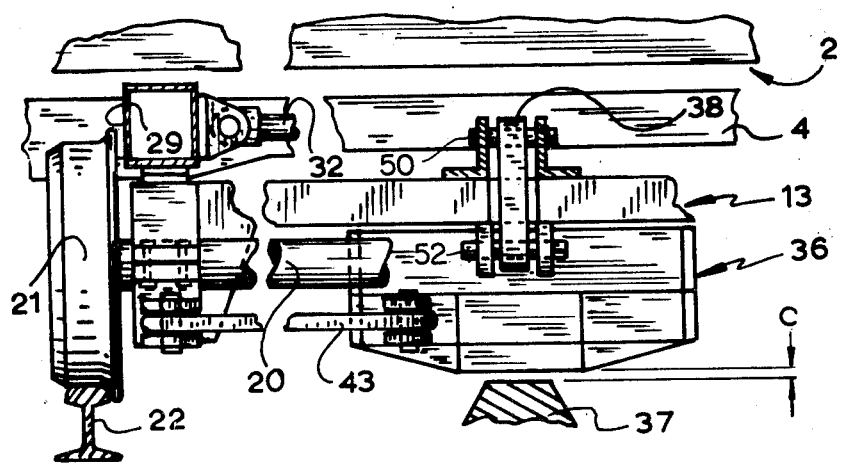
FIG. 6 is a partial end view of the railway truck and LIM propulsion assembly.

The linear induction motor or LIM unit 36 is shown in outline only, in FIGS. 3, 5 and 6 and may be of any appropriate construction, as known in the art to produce a propulsive action against a reaction rail 37 spaced between the rails 22. The LIM unit 36 is of relatively flat and elongated shape to be accommodated beneath the yokes and the bolster.

A system of three vertical links support the LIM unit relative to the yokes and the side frames. This system of links includes a single suspension link 38 pivotally suspending the outboard end of the LIM unit 36 to the outboard steering yoke 13. The single suspension link 38 is centrally positioned transversely of the LIM unit 36 and yoke 13 and, as may be seen in FIGS. 3 through 6, is pivotally connected at opposite ends to the yoke 13 and motor 36 by pins 50,52 respectively. The system of vertical links also includes a pair of suspension links 39 spaced apart along the axle 20 on opposite sides of the longitudinal axis. Pins 54, 56 pivotally connect the links 39 the inboard end of the LIM unit 36 to the inboard steering yoke 14 respectively. Each suspension link 38, 39,39 is pivotally supported to permit displacement of the yokes 13, 14 relative to the LIM along the longitudinal axis of the truck. The suspension link 38 is connected to the yoke 13 of the railway truck adjacent to the steering axis of yoke 13 and the trucks 39 are located equidistant from the axis of the yoke 14. The pins 50, 52, 54, 56 define swivelling connections, with limited universal movement to connect the ends of the suspension links to the yokes and to the LIM unit to allow some transverse swivelling of the suspension links relative to the LIM unit and/or to the yokes. The three point suspension defined by the links 38, 39 allows the yokes 13, 14 to pitch relative to one another as uneveness in the track is encountered without inducing torsional loads in the motor 36. The motor 36 follows movement of the yoke 14 by virtue of the two transversely spaced links 39 with the pin connections 50, 52 permitting twisting of the LIM 36 about the longitudinal axis relative to the yoke 13. Upon the yokes 13, 14 adopting a steering position the line 38 accommodates pivotal movement of the yoke 13 and the pins 54, 56 allow equal and opposite displacement of the links 39 in the longitudinal direction to maintain the LIM centered with respect to the yoke 13.

The lateral and longitudinal position of the LIM established by a system of links in a generally horizontal plane. A drag link 40 extends lengthwise longitudinally of the LIM unit or railway truck and is pivotally connected at one end to a rail portion 41 of the inboard yoke 14 and at the other end to a bracket 42 rigidly projecting from the LIM unit. The outboard end of the drag link 40 is pivoted to the yoke 14 about a vertical axis 60 while the inboard end is pivoted about a transverse axis 62. The vertical axis 60 is located as close as possible to the steering axis of yoke 14 so that upon the yoke adopting a steering position, the offset of the line of action of the drag link 40 is minimized and the steering couple induced in the yoke 14 by the thrust is likewise minimized. It will also be observed that the drag link 40 is offset vertically by a small amount relative to the draft links 27 so that the thrust forces provide a positive couple to maintain equal loadings on each of the axles 20 as the center of force of the LIM changes during acceleration. Both ends of the link 40 also allow for swivelling motion by appropriate rod end connection.

The system of horizontal links also includes a pair of lateral links 43 and 44 laterally restraining the LIM unit relative to the yokes 13, 14 to maintain it centered.

As can be seen in FIG. 3, the links 43, 44 are connected to the yokes 13, 14 and the motor 36 by pins 64 allowing pivotal movement of the links about a vertical axis. The links 44 are placed on opposite sides of the longitudinal axis of the truck and are also orientated so that the connections to the yokes 13, 14 are spaced further apart than the connections to the motor 36. The links 43, 44 are also aligned to pass through the respective steering axes of the yokes 13, 14 when the axles 20 are parallel to minimize the steering couples exerted on the yokes by forces in the links 43, 44. The displacement of the links to opposite sides of the longitudinal axis ensures that forces tending to cause yawing motion of the LIM 36 relative to the truck do not cause steering motions of the yokes 13, 14 as the steering couples induced by such motion are equal and opposite and therefore balance each other out.

However the divergence of the links from the transverse axis provides a beneficial effect if the LIM is subjected to lateral forces. In this case the forces in the links 43, 44 provide steering couples in the yokes in an opposite sense so that the yokes 13, 14 adopt a steering position. This causes the truck to steer into the rail to minimize the effect of the lateral disturbance on the vehicle and improve the dynamic stability of the truck.

It will be understood that links 38, 29, 39, 40, 43, and 44 restrain the LIM unit vertically, longitudinally, and laterally relative to the yokes 13 and 14 but are pivotally and swivelly connected to allow the relatively small angular steering of the yokes relative to the side frames. It must be noted that the lateral links 43 and 44 are connected to the yokes and the center line of each link is aligned as nearly as possible with the yaw rotation center of the yoke to minimize the error in alignment with the railway track when the yokes are steered. Thus, the LIM unit 36 is also kept in alignment with the reaction rail 37 beside being kept at a precise gap height C above this rail.

It must be noted that changes in the details of construction are possible and fall within the scope and principle of the present invention defined by appended claims.

What is claimed is:

1. A steerable truck comprising a main frame for connection to a vehicle body, a pair of axle assemblies supporting said main frame and connected thereto at locations spaced apart along a longitudinal axis of said truck for steering movement about respective spaced generally vertical steering axes, a linear induction motor extending between said axle assemblies for cooperation with a reaction rail to propel said truck, and suspension means extending between said motor and said axle assemblies to locate vertically said motor, said suspension means comprising first link means connecting said motor to one of said axle assemblies to inhibit relative pivotal movement between said motor and said assembly about the longitudinal axis of said truck while permitting relative pivotal movement between said motor and said one axle assembly about its steering axis, and second link means connecting said motor to the other of said axle assemblies to permit relative pivotal movement therebetween about said longitudinal axis and about the steering axis of said other axle assembly, said suspension means thereby permitting steering motion and torsional flexibility between said axle assemblies while inhibiting the application of torsional loads to said motor.

2. A steerable truck according to claim 1 including thrust transmission means to transmit thrust from said motor to a first of said axle assemblies.

3. A steerable truck according to claim 2 wherein said thrust transmission means include a strut connected to said first axle assembly adjacent said steering axis.

4. A steerable truck according to claim 3 wherein a draft connection is provided on said axle assemblies to transmit draft loads from said truck to said vehicle body and said strut is connected to said axle assembly at a location above said draft connection thereby to provide a couple to said truck about a transverse horizontal axis upon application of thrust from said motor.

5. A steerable truck according to claim 1 wherein said first link means includes a pair of laterally spaced links each of which extends from said axle assembly to said motor and is connected at respective ends to said axle assembly and said motor by pivotal connections permitting relative displacement between the axle assembly and the motor along the longitudinal axis of the truck.

6. A steerable truck according to claim 5 wherein a line connecting said laterally spaced links intersects said steering axis.

7. A steerable truck according to claim 6 wherein said links are located on opposite sides of said longitudinal axis and equidistant therefrom.

8. A steerable truck according to claim 5 wherein said second link means is located adjacent the steering axis of said other axle assembly.

9. A steerable truck according to claim 8 wherein said second link means is pivotally connected at opposite ends to said motor and said axle assembly respectively to accommodate longitudinal displacement of said motor relative to said axle assembly.

10. A steerable truck according to claim 8 wherein said first and second link means are universally connected to said motor and respective axle assemblies.

11. A steerable truck according to claim 5 wherein centering means act between said motor and said axle assemblies to inhibit lateral movement of said motor relative to said axle assemblies.

12. A steerable truck according to claim 11 wherein said centering means includes a pair of lateral struts, each lateral strut extending between said motor and a respective one of said axle assemblies.

13. A steerable truck according to claim 12 wherein said lateral struts lie on a line passing through the steering axis of its respective axle assembly.

14. A steerable truck according to claim 13 wherein said lateral struts are inclined to the longitudinal axis of said truck and attached to said axle assemblies at a point displaced laterally and longitudinally.

15. A steerable truck according to claim 14 wherein said struts are disposed on opposite sides of said longitudinal axis.

16. A steerable truck according to claim 14 wherein when measured along the longitudinal axis, the distance between the connections of said struts to said respective axle assemblies is greater than the distance between said steering axes so that a lateral force on said motor induces equal and opposite steering motion of said axle assemblies.

17. A steerable truck comprising a pair of wheelsets spaced apart along a longitudinal axis of said truck, a pair of yokes each associated with a respective one of said wheelsets, a main frame supported by said yokes and connected thereto to permit rotation of said yokes relative to said main frame about respective spaced vertical steering axes, a linear induction motor located beneath said yokes for cooperation with a reaction rail, suspension means to suspend said motor from said yokes to maintain said motor in a fixed vertical orientation relative to said truck, thrust means to transmit longitudinal forces from said motor to said yokes and centering means to inhibit lateral displacement of said motor relative to said yokes, said suspension means comprising three links each having universal connections at each end for connection to said motor and a respective one of said axle assemblies, two of said links being connected at spaced locations between one of said axle assemblies and said motor and the other of said links being connected between the other of said axle assemblies and said motor, said links thereby permitting steering and torsional deflection between said axle assemblies while being vertically supported thereby.

18. A steerable truck according to claim 17 wherein said centering means includes a pair of lateral struts each connected to said motor and a respective one of said yokes by pivotal connections to accommodate steering motion of said yoke relative to said motor.

19. A steerable truck according to claim 18 wherein said lateral struts are disposed on opposite sides of the longitudinal axis of said truck and are connected to said yokes at locations displaced from said steering axes along said longitudinal axis, whereby lateral forces applied to said motor are transmitted to said yokes to induce equal and opposite steering action of said yokes about their axes.

20. A steerable truck according to claim 19 wherein said lateral struts are located on opposite sides of said longitudinal axis and are each connected to said yokes outboard of their respective steering axes, thereby to prevent steering action of said yokes upon yaw of said motor relative to said truck.

21. A steerable truck according to claim 20 wherein said thrust means includes a longitudinal link connected between said motor and one of said yokes and connected to said one yoke by a pivotal connection adjacent the steering axis of said one yoke to accommodate steering motion of said yoke and minimize the steering force couple generated by the thrust of said motor upon movement of said yokes to a steering position.

* * * * *